Feb. 28, 1956 G. M. WIDELL 2,736,501
TEMPERATURE COMPENSATING DEVICE
Filed April 20, 1951
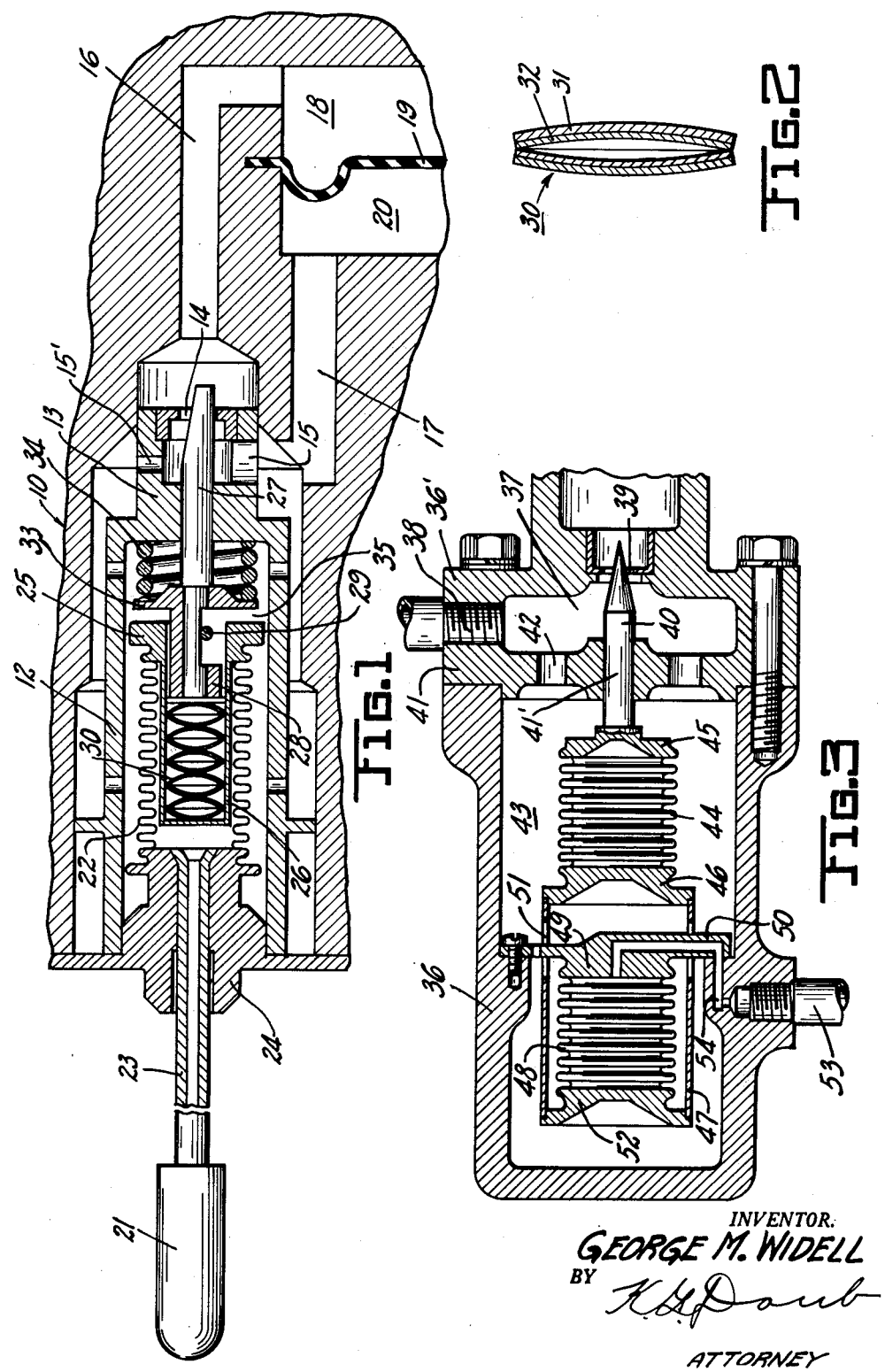
INVENTOR.
GEORGE M. WIDELL
BY
ATTORNEY

United States Patent Office 2,736,501
Patented Feb. 28, 1956

2,736,501

TEMPERATURE COMPENSATING DEVICE

George M. Widell, South Bend, Ind., assignor to Bendix Aviation Corporation, South Bend, Ind., a corporation of Delaware Application April 20, 1951, Serial No. 222,001

7 Claims. (Cl. 236—99)

This invention relates to a temperature compensating device for fuel control or analagous systems; it is more particularly concerned with temperature sensing and compensating circuits which employ an expansible bellows carrying a needle valve or like element at its movable end for controlling a flow orifice and connected to a temperature bulb located in the region of the temperature being sensed by means of a capillary tube, the bulb, tube and bellows being loaded or charged with a suitable temperature responsive medium.

When using a temperature sensing device of this type in fuel metering systems, difficulty has been experienced in avoiding the effects of changes in temperature on the volume of the fluid in the circuit other than changes in the absolute temperature of the air or other media being sensed. This difficulty can be greatly alleviated by mounting the bellows which carries the needle valve in a constant temperature chamber (which may be had by insulation), but here the problem becomes one of providing an effective and durable seal around the needle which controls the flow orifice. Such seal becomes unnecessary when the bellows is mounted in the control housing or chamber containing the fuel or fluid to be regulated, but in an installation of such type, changes in temperature of the fuel, unless compensated for, produce an error in the response of the bellows.

The primary object of the present invention is to provide a temperature sensing device employing a bellows, bulb and capillary tube, loaded or charged with a suitable temperature responsive medium, having novel and improved means for canceling out or compensating for the effects of changes in temperature of the fuel or other fluid being regulated on the bellows.

The foregoing and other objects and advantages will become apparent in view of the following description taken in conjunction with the drawings, wherein:

Figure 1 illustrates a temperature sensing device in accordance with the invention with the bellows and needle valve assembly shown in longitudinal section installed in the housing of a fuel control or metering system;

Figure 2 is a detail view of a pair of the concave disc-shaped elements which make up the stack of metallic compensating discs within the bellows; and Figure 3 is a longitudinal section of a modified form of compensating bellows assembly.

Referring to Figure 1, a portion of the housing or body part of a fuel control device is indicated at 10; it is provided with a chamber 11, in which is located a cylindrical housing or guide casing 12, mounting a bellows and needle valve assembly embodying one form of the invention. At its right-hand end the casing 12 terminates in a ported needle guide portion 13 having an inlet orifice 14 and outlet ports or orifices 15 and 15' which open into the chamber 11, the orifices 14 and 15 constituting part of a flow passage 16, 17 which communicates a chamber 18 on one side of a diaphragm 19 with a chamber 20 on the opposite side thereof. As will be obvious, when the effective area of the orifice 14 is varied, the pressure differential across the diaphragm 19 is likewise varied. Said diaphragm may be employed to control a valve or other regulating instrumentality, not pertinent to the invention.

A temperature sensing bulb is indicated at 21; it has a fluid or gas connection with the interior of a bellows 22 by means of a capillary tube 23, the bulb, tube and bellows being filled with a suitable temperature responsive fluid such as alcohol. The bulb 21 is, of course, located to sense the temperature of the desired parameter. When there is a change in temperature of the medium being sensed, the fluid is varied in volume, which in turn varies the position of the movable end of the bellows 22.

The bellows 22 is shown anchored at its one end to a cap member 24 and at its opopsite end is connected to a slidable bushing 25, secured on the open end of a hollow sleeve or cylinder 26. A needle 27 has its contoured end arranged to control the orifice 14 and at its opposite end is secured to a bushing 28, slidable in the open end of the cylinder 26. A pin 29 projects through a recessed portion of the bushing 28 and retains the latter in its mounting while at the same time permitting limited movement of said bushing and the needle valve carried thereby.

The cylinder 26 is loaded with a stack of bimetallic compensating discs 30, the stack at the open end of the cylinder engaging the adjacent end of the slidable bushing 28. The bimetallic discs 30 are dished or concave, as shown in detail in Figure 2, and each disc is made up of inner and outer layers 31 and 32 of material having different coefficients of expansion, with the inner side 32 of each disc having a higher coefficient of expansion than the outer side thereof. In practice, satisfactory results have been obtained from the use of an alloy consisting of 22% nickel, 3% copper and 75% ferrous or iron for the inner side, and Invar steel for the outer side.

The bushing 28 which carries the needle valve 27 is formed with an abutment collar 33 at its outer end, and a spring 34 engages between this collar and the adjacent end wall of the outer casing 12 and normally urges the bushing against the stack of discs 30. It will be noted that there is clearance at 35 to permit a certain amount of relative compensating movement between the bushing 28 and inner cylinder 26. It will further be noted that the outer guide casing 12 is formed with openings to permit fuel in chamber 11 to circulate around the bellows 22.

OPERATION

Any changes in temperature of the medium sensed by the bulb 21 causes the movable end of the bellows 22 to move outwardly or inwardly in the casing 12 and reposition the needle 27 in orifice 14. As long as the temperature of the fuel remains constant, the position of the needle bushing 28 with respect to the movable end of the bellows will remain fixed or constant.

Should there be a change in temperature of the fuel in the chamber 11, it will be communicated to the stack of discs 30, and the latter will tend to flatten out and shorten, or contract and increase, the overall length of the entire stack. The stack of discs is so arranged as to produce a compensating movement which is equal but opposite to any expansion or contraction of the bellows 22 resulting from changes in temperature of the fuel, so that the needle 13 remains in its same relative position. In the arrangement shown, an increase in temperature tends to flatten the discs, a decrease in temperature of the fuel having the opposite effect. It will therefore be seen that the position of the needle 13 relative to the flow orifice 14 will remain constant at a given temperature of the air or other medium being sensed irrespective of changes in the temperature of the fuel surrounding the bellows 12.

Figure 3

In Figure 3 a modified fuel temperature compensating bellows assembly is shown. In this instance a bellows housing is indicated at 36; it is provided with an end member or cap 36', which is formed with a chamber 37, having a fuel intake port at 38 and an outlet orifice at 39 controlled by a needle 40. The needle is guided in the hub portion 41' of a wall 41, which is ported as at 42 to vent fuel to the bellows chamber 43.

A fuel temperature compensating bellows 44 has its movable end connected to and sealed by a member 45 carrying needle valve 40, and at its opposite end is connected to and sealed by a cap 46, anchored to the adjacent end of a hollow cylinder 47. An actuating bellows 48 is provided in series with the bellows 44 and at its one end is anchored to a boss 49, formed with radial projections 50 secured to an inner flanged portion of the housing 36. The container 47 is formed with elongated slots 51, to accommodate the radial projections 50. The movable end of the bellows 48 is connected to a cap 52, which in turn is connected to the adjacent end of the cylinder 47. A capillary tube 53 connects a temperature sensing bulb, not shown in Figure 3 but which could be the bulb 21 of Figure 1, with the interior of the bellows 48 by way of passage 54 formed in one of the radial projections 50.

Both the fuel temperature compensating bellows 44 and the actuating bellows 48 have the same effective travel vs. ambient temperature characteristics.

In operation, should there be a change in temperature of the fuel in the chamber 43, the position of the needle 40 with respect to orifice 39 will remain unchanged, since the bellows 44 acts counter to the bellows 48, and hence the movement of one bellows will compensate for movement of the other.

The temperature compensating device of Figure 3 may be found suitable for certain installations, although it is less compact and requires more space than the device of Figures 1 and 2.

I claim:

1. In a temperature compensating system, a hollow expansible and contractible member internally charged with a fluid medium which changes in volume in response to changes in temperature of a parameter, a temperature sensing device in pressure communication with the fluid medium in said member, and means for compensating for responses of said member to changes in temperature of a fluid medium in the immediate region of and external to said member comprising a temperature responsive element disposed within said member, said element being so constructed that it expands and contracts as a result of being subjected to changes in the temperature whenever said member contracts and expands, respectively.

2. In a system for modifying the effective area of an orifice as a function of changes in temperature of a parameter, a valve for controlling said orifice, a hollow expansible and contractible member such as a bellows operatively connected to said valve and charged with a fluid medium which changes in volume in response to changes in temperature of said parameter, a temperature sensing device for sensing changes in temperature of said parameter, said device being in pressure communication with the fluid medium in said member, and means for compensating for responses of said member to changes in temperature of the fluid medium regulated by said valve comprising a plurality of temperature responsive elements disposed within said member and also operatively connected to said valve, each of said elements being comprised of material having different coefficients of expansion and being so arranged as to act counter to said member to compensate for movement of the latter in response to changes in temperature of the fluid medium being regulated by said valve.

3. A system as claimed in claim 2 wherein there is a means defining a chamber within the confines of said member, temperature responsive elements being fully disposed within said chamber.

4. In a system for modifying the effective area of an orifice as a function of changes in temperature of a parameter, a valve for controlling said orifice, a temperature responsive member connected to said valve and charged with a fluid medium which changes in volume in response to changes in temperature of said parameter, said member being located in a chamber which is vented to the fluid medium being regulated, a temperature sensing device in pressure communication with the fluid medium in said member, and means located within the confines of said member for compensating for responses of said member to changes in temperature of the fluid medium regulated by said valve comprising a stack of dish-shaped bimetallic discs each of which is made up of inner and outer layers of material having different coefficients of expansion and arranged to act counter to said member when subjected to changes in temperature of the fluid medium surrounding the member, said discs being also operatively connected to said valve.

5. In a system for modifying the effective area of an orifice as a function of changes in temperature of a parameter, a valve for controlling said orifice, a hollow expansible and contractible member such as a bellows operatively connected to said valve, said member being charged with a fluid medium which changes in volume in response to changes in temperature of the parameter, a temperature sensing bulb in pressure communication with the fluid medium in said member, and a stack of bimetallic discs mounted within said member and also operatively connected to said valve for compensating for response of said member to changes of temperature of the fluid medium regulated by said valve, said discs when subjected to changes in temperature acting counter to said member to compensate for movement of said member in response to changes in temperature of the fluid medium being regulated.

6. In combination, fluid flow regulating means comprising an orifice and a valve for controlling the effective area of said orifice, means defining a chamber, a member disposed in said chamber movable in response to changes in temperature of a medium being sensed and operatively connected to said valve, an element defining a cavity within the confines of said member, said cavity communicating with said chamber and sealed from the temperature of the medium being sensed, and a movable motion compensating device disposed within said cavity responsive to changes in temperature in said chamber and also operatively connected to said valve, said device being so constructed and arranged that it moves in a direction to compensate for movement of said member resulting from a change in the temperature in said chamber, whereby the position of said valve is insensitive to changes in temperature in said chamber.

7. In a temperature compensating system, a hollow expansible and contractible member internally charged with a fluid medium which changes in volume in response to changes in temperature of a parameter, a temperature sensing device in pressure communication with the fluid medium in said member, and means for compensating for responses of said member to changes in temperature of a fluid medium in the immediate region of and external to said member comprising at least one bi-metallic disc which is made up of inner and outer layers of material having different coefficients of expansion and arranged to act counter to said member when subjected to changes in temperature of the fluid medium surrounding said member, said discs being located within the confines of said member.

References Cited in the file of this patent

UNITED STATES PATENTS

| | | | |
|---|---|---|---|
| 900,511 | Fulton | Oct. 6, | 1908 |
| 1,347,689 | Fitts | July 27, | 1920 |
| 1,752,390 | Nelson | Apr. 1, | 1930 |
| 1,834,375 | Bletz | Dec. 1, | 1931 |
| 1,894,842 | Appleberg | Jan. 17, | 1933 |
| 2,053,974 | Smith | Sept. 8, | 1936 |
| 2,071,019 | Beebe | Feb. 16, | 1937 |
| 2,101,735 | Fonseca | Dec. 7, | 1937 |
| 2,154,030 | Brumbaugh | Apr. 11, | 1939 |
| 2,228,767 | Johnsson | Jan. 14, | 1941 |
| 2,233,117 | Waddell | Feb. 25, | 1941 |
| 2,242,718 | Dynes | May 20, | 1941 |
| 2,487,213 | Bender | Nov. 8, | 1949 |